(12) United States Patent
Marcil et al.

(10) Patent No.: US 8,416,427 B2
(45) Date of Patent: Apr. 9, 2013

(54) THREE-DIMENSIONAL SURFACE MEASURING SCANNER

(75) Inventors: François Marcil, Montreal (CA); Christian Matz, Montreal (CA); Louis Geoffroy, Otterburn Park (CA); Elmekki Ennajimi, Montreal (CA)

(73) Assignee: Numeq Inc., Saint-Laurent, Quebec (CA)

( * ) Notice: Subject to any disclaimer, the term of this patent is extended or adjusted under 35 U.S.C. 154(b) by 0 days.

(21) Appl. No.: 12/744,182

(22) PCT Filed: Nov. 24, 2008

(86) PCT No.: PCT/CA2008/002064
§ 371 (c)(1),
(2), (4) Date: Feb. 22, 2011

(87) PCT Pub. No.: WO2009/065227
PCT Pub. Date: May 28, 2009

(65) Prior Publication Data
US 2011/0176147 A1    Jul. 21, 2011

Related U.S. Application Data

(60) Provisional application No. 60/989,880, filed on Nov. 23, 2007.

(51) Int. Cl.
*G01B 11/00* (2006.01)
*G01B 11/30* (2006.01)

(52) U.S. Cl.
USPC .................................... 356/602; 356/607

(58) Field of Classification Search ........... 356/601–613
See application file for complete search history.

(56) References Cited

U.S. PATENT DOCUMENTS

| 6,664,531 | B2 | 12/2003 | Gartner et al. |
| 2004/0252312 | A1 | 12/2004 | Chen |
| 2012/0257033 | A1* | 10/2012 | Rowe .............................. 348/77 |

* cited by examiner

*Primary Examiner* — Tarifur Chowdhury
*Assistant Examiner* — Tara S Pajoohi Gomez
(74) *Attorney, Agent, or Firm* — Norton Rose Canada LLP

(57) ABSTRACT

There is described a scanner having a frame with a support, two lasers attached to the frame and two optical sensors attached to the frame, the lasers and optical sensors being positioned and oriented to reduce shadowing effects for the cameras and for the laser lines while covering close to 100% of the surface of an object to be imaged and reducing the scanning time.

14 Claims, 7 Drawing Sheets

_US 8,416,427 B2_

THREE-DIMENSIONAL SURFACE MEASURING SCANNER

CROSS-REFERENCE TO RELATED APPLICATIONS

This application claims priority under 35 USC §119(e) of U.S. Provisional Patent Application No. 60/989,880 filed on Nov. 23, 2007, the contents of which are hereby incorporated by reference.

TECHNICAL FIELD

The present invention relates to the field of three-dimensional surface measuring scanners, such as those for dental applications, medical applications, automotive applications, and other areas where a 3D surface is measured and reproduced virtually.

BACKGROUND OF THE INVENTION

Multiple scanners, such as those in the dental industry, are based on laser triangulation. In these systems, a laser beam is projected on an object to be digitized, such as a dental casting, for example. By imaging the diffuse reflectance of the laser beam on the object, the distance to the object is measured and a three-dimensional (3D) image of the object can be reconstructed.

Numerous dental scanners include a single sensor to take images of a dental casting in order to create the 3D image. The sensor is displaceable in order to take images of different views of the dental casting. Then the dental scanner creates a 3D image of the dental casting from the different views and using data processing. The sensor is usually moved by means of a motor and the exact position of the sensor must be known when the images of the dental casting are taken. Because the movements of a motor are not always perfectly reproducible, an error on the sensor position can be introduced which affects the quality of the scan and periodic calibration of the scanner is needed to reduce the error on the sensor position.

Therefore, there is a need for an improved scanner.

SUMMARY

There is described a scanner having a frame with a support, two lasers attached to the frame and two optical sensors attached to the frame, the lasers and optical sensors being positioned and oriented to reduce a shadow effect for the cameras while covering close to 100% of the surface of an object to be imaged. The present scanner is not to be limited to dental applications.

According to a broad aspect, there is provided a scanner system for scanning an object comprising: a frame comprising a support for receiving the object, the support having a rotational axis extending vertically therefrom; a first laser and a second laser attached to the frame and emitting a first beam of light centered on a first illumination axis and a second beam of light centered on a second illumination axis, respectively, the first laser being positioned and oriented such that the first beam of light illuminates at least a first region of the object when received on the support, the second laser being positioned and oriented such that the second beam of light illuminates at least a second region of the object when received on the support, the first illumination axis and the second illumination axis defining an illumination plane and intersecting the rotational axis at a first intersection angle and a second intersection angle, respectively, the first intersection angle being comprised in a first range from about −15 degrees to about −5 degrees or from about 5 degrees to about 15 degrees, and the second intersection angle being comprised in a second range from about −65 degrees to about −55 degrees or from about 55 degrees to about 65 degrees; and a first optical sensor and a second optical sensor attached to the frame and having a first field of view centered on a first sensing axis and a second field of view centered on a second sensing axis, respectively, the first optical sensor being positioned and oriented on one side of the illumination plane such that at least the first region of the object is within the first field of view and the second optical sensor being positioned and oriented on another side of the illumination plane such that at least the second region of the object is within the second field of view.

A field of view of a sensor is defined as the angular extent of the observable world that can be measured by the sensor. The field of view is also called the angular field of the sensor.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
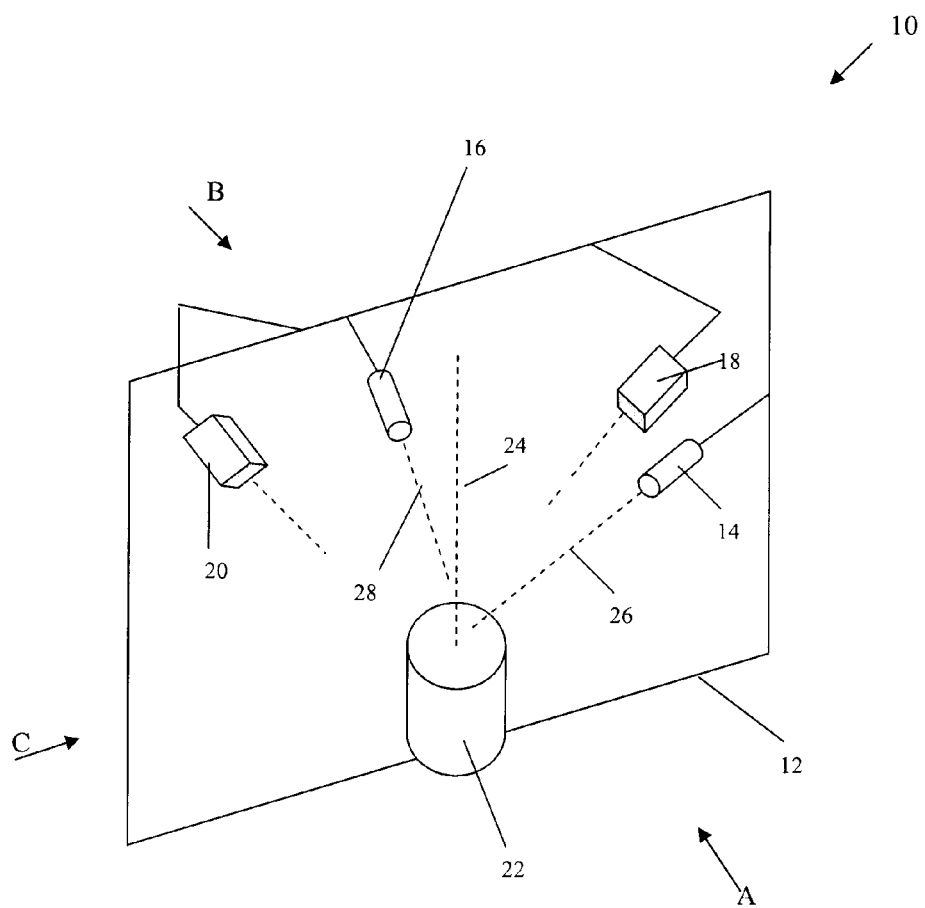
FIG. 1 is a perspective view of a scanner comprising a rectangular frame, in accordance with an embodiment.

FIG. 1 illustrates one embodiment of a scanner 10 for digitizing an object in order to obtain a 3D representation of this object. The scanner 10 comprises a frame 12, a first laser 14 emitting a first beam of light, a second laser 16 emitting a second beam of light, a first camera 18 having a first field of view, and a second camera 20 having a second field of view. The frame 12 also comprises a support 22 adapted to receive the object to be scanned. The object is received on the top surface of the support 22 which is rotatable about a rotational axis 24 which extends perpendicularly from the top surface. The lasers are used for illuminating the object and the cameras are used for imaging the diffuse reflectance of the laser beam on the object. By rotating the object, it is possible to scan substantially the whole surface of the object.

The first laser 14 is positioned and oriented such that its emitted beam of light illuminates at least one region of the object when this object is positioned on the support and such that an illumination axis 26 on which the beam of light of the first laser 14 is centered intersects the rotational axis 24. The second laser 16 is positioned and oriented such that the beam of light emitted by the second laser 16 illuminates at least one region of the object positioned on the support 22 and such that an illumination axis 28 on which the beam of light emitted by the second laser 16 is centered intersects the rotational axis 24. In one embodiment, the regions of the object illuminated by the lasers 14 and 16 are substantially the same. In another embodiment, these regions are different.

Figure 2:
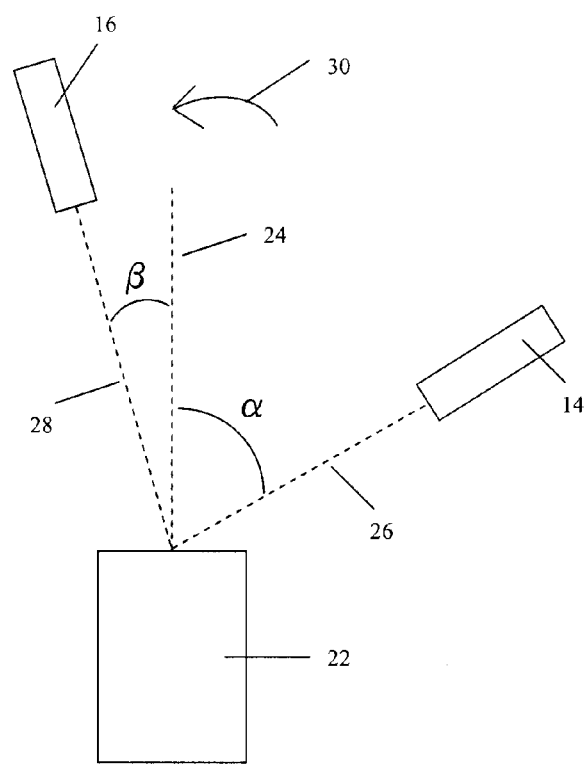
FIG. 2 illustrates the positioning of lasers with respect to rotational axis, in accordance with an embodiment.

The axes 24, 26, and 28 are all comprised in a single plane defined as the illumination plane as illustrated in FIG. 2. The illumination axis 26 and the rotational axis 24 intersect at an angle α while the illumination axis 28 and the rotational axis 24 intersect at an angle β. Throughout the description, angles are positive if measured anticlockwise according to arrow 30. When referring to angles between an illumination axis 26, 28 of a laser and the rotational axis, the angles are measured from the laser axis 26, 28 to the rotational axis 24. As a result, in the embodiment illustrated in FIG. 2, the angle α is positive while the angle β is negative, when looking at the scanner 10 in accordance with arrow A illustrated in FIG. 1. It should be understood that the angle α will be negative while the angle β will be positive if the scanner 10 is viewed in accordance with arrow B.

The angle α is comprised in a first range from about minus sixty-five degrees to about minus fifty-five degrees or from about fifty-five degrees to about sixty-five degrees while the angle β is comprised in a range from about minus fifteen degrees to about minus five degrees or from about five degrees to about fifteen degrees. As a result, the lasers 14 and 16 can be positioned on different sides of the rotational axis 24, as illustrated in FIG. 2, or on the same side of the rotational axis 24. The particular values for the angles α and β allow for the reduction/elimination of shadows caused by the laser lines on the object due to the particular shape of the object preventing the laser beam from illuminating a complete line of the object. In one particular embodiment, the angle α is about minus sixty degrees or about sixty degrees and the angle β is about minus ten degrees or about ten degrees.

Referring back to FIG. 1, the first camera 18 is positioned on a first side of the illumination plane while the second camera 20 is positioned on the other side of the illumination plane. While the cameras 18 and 20 are positioned on the right and on the left of the illumination plane, respectively, when one looks at the scanner 10 according to arrow C, it should be understood that the positions of the cameras 18 and 20 can be reversed. This particular positioning of the camera allows a reduction of laser triangulation shadowing effects. These shadowing effects occur when the camera cannot see the region illuminated by the laser because of the shape of the object, such as a relief. The first camera 18 is oriented such that the region of the object illuminated by the first laser 14 is within the field of view of the first camera 18. The second camera 20 is oriented such that the region of the object illuminated by the second laser 16 is within the field of view of the second camera 20.

In one embodiment, the first camera 18 is positioned such that its axis 32 is in a plane comprising the axis 26 of the first laser 14 and orthogonal to the illumination plane 33. The plane comprising the axis 26 and orthogonal to the illumination plane 33 is referred to as the first orthogonal plane. The second camera 20 is positioned such that its axis 34 is in a plane comprising the axis 28 of the second laser 16 and orthogonal to the illumination plane 33. The plane comprising the axis 28 and orthogonal to the illumination plane 33 is referred to as the second orthogonal plane.

Figure 3:
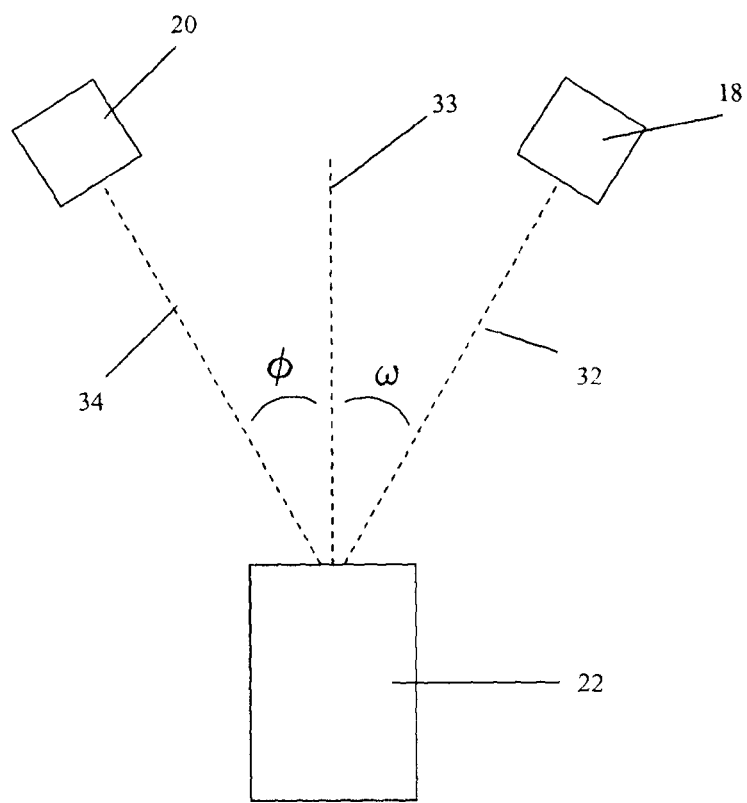
FIG. 3 illustrates the positioning of cameras with respect to an illumination axis, in accordance with an embodiment.

In one embodiment, the first camera 18 is positioned such that the angle ω between the axis 32 and the illumination plane 33 is about thirty degrees or about minus thirty degrees whether or not the axis 32 is comprised in the first orthogonal plane, as illustrated in FIG. 3. The second camera 20 is positioned such that the angle φ between the axis 34 and the illumination plane 33 is about minus thirty degrees or about thirty degrees whether or not the axis 34 is comprised in the second orthogonal plane. It should be understood that if the angle ω is positive, then the angle φ is negative and vice versa. This configuration allows for the reduction of shadowing effects.

In another embodiment, the first camera 18 is positioned such that the angle ω is about forty-five degrees or about minus forty-five degrees whether or not the axis 32 is comprised in the first orthogonal plane while the second camera 20 is positioned such that the angle φ is about minus forty-five degrees or about forty-five degrees whether or not the axis 34 is comprised in the second orthogonal plane. It should be understood that if the angle ω is positive, then the angle φ is negative and vice versa. These particular camera positions provide an improved measurement accuracy as a wide vision angle is provided to the cameras 18, 20.

In one embodiment, the distance between the object/support and the cameras and lasers, referred to as the working distance, is defined as a function of the sensor-lens-object-motion combination. The camera is chosen as a function of parameters such as the quality of signal, frame rate speed, and the like. The lens is chosen is chosen to mediate between the object and the image (camera sensor) also taking into consideration parameters such as resolution and approximate working distance to allow for the range of the motion system. The working distance can be optimized after some testing such as determining the best resolution as a function of the working distance.

In one embodiment, the lasers 14 and 16 illuminate substantially the same region of the object and this region is within the field of view of both the first and the second cameras 18 and 20. In another embodiment, the first laser 14 and the second laser 16 illuminate different regions of the object. The first camera 18 is positioned such that the region of the object illuminated by the first laser 14 is within the field of view of the camera 18 while the second camera 20 is positioned such that the region of the object illuminated by the second laser 16 is within the field of view of the camera 20. The first laser 14 and the first camera 18 form a first scanning assembly while the second laser 16 and the second camera 20 form a second scanning assembly. Alternatively, each one of the cameras 18 and 20 may be positioned and adapted to comprise the whole object in their field of view.

In one embodiment, positioning the lasers 14 and 16 having particular values for angles α and β and positioning the cameras having particular values for the angles φ and ω allows the digitization of the whole object following a 360 degrees rotation with the utilization of only two lasers and two cameras. Furthermore, the particular positions and orientations of the different components also allow the reduction of the shadowing effects and the scanning time required to digitize the whole object.

In one embodiment, the scanner 10 is a dental scanner for scanning dental castings, prostheses, crowns, bridges, and other dental objects. The angles α and β are equal to about ±10 degrees and about ±sixty degrees, respectively, while the camera angles φ and ω are both equal to about ±thirty degrees, with angle φ being positive if ω is negative, and vice versa.

In one embodiment, the support 22 comprises two translation stages in addition to the rotation stage allowing the rotation about the rotational axis 24. The translation stages allow moving the object to be scanned in a horizontal plane in the event the size of the object is too large to allow a complete scan of the object following a 360 degrees rotation.

It should be understood that the scanner 10 can comprise further lasers and cameras in addition to the lasers 14 and 16, and the cameras 18 and 20.

Figure 4:
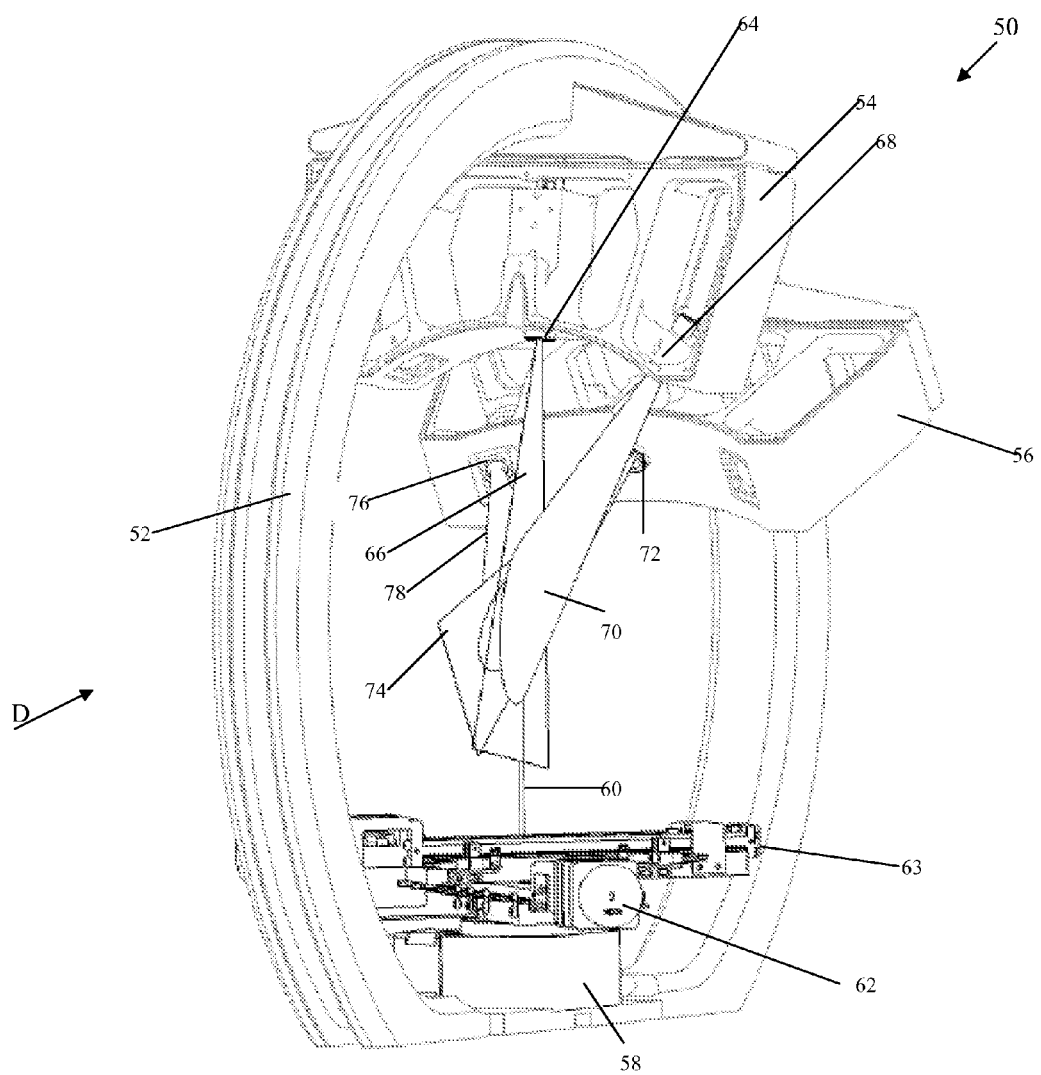
FIG. 4 is a perspective view of a scanner comprising two scanning modules, in accordance with an embodiment.

FIG. 4 illustrates one embodiment of a scanner 50 comprising a circular frame 52, a first scanning module 54, a second scanning module 56, and a support assembly for receiving an object to be scanned. The support assembly comprises a motorized rotational stage 58 having a rotational axis 60. Two motorized translation stages 62 and 63 are mounted on the rotational stage 58.

Figure 5:
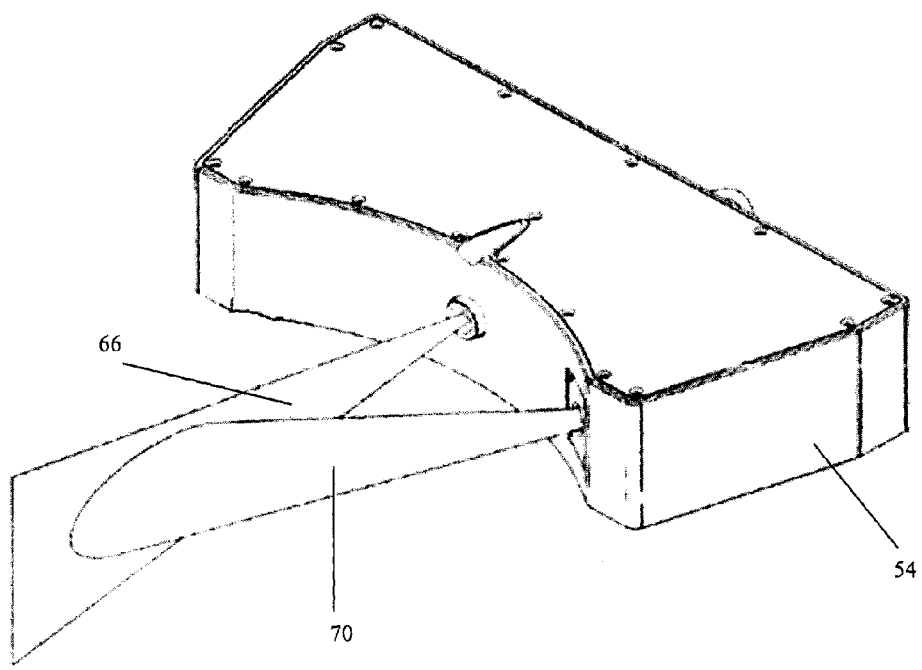
FIG. 5 is a perspective view of a scanning module comprising a single camera, in accordance with an embodiment.

The first scanning module 54 comprises a laser 64 emitting a laser beam 66 and a camera 68 having an angular field or field of view 70, as illustrated in FIGS. 4 and 5. The second scanning module 56 comprises a second laser 72 emitting a laser beam 74 and a second camera 76 having an angular field 78. The lasers 64, 72, and the cameras 68, 76 are fixedly secured into their respective scanning module 54, such that no relative movement occurs between the laser 64, 72 and the camera 68, 76.

The laser axis on which the beam 66 is centered and the laser axis on which the beam 74 is centered intersect the rotational axis 60 and these three axes are part of a single plane, namely the illumination plane. The angle between the axis of the laser 64 and the rotational axis 60 is about ten degrees while the angle between the axis of the laser 72 and the rotational axis 60 is about sixty degrees. Both scanning modules 54 and 56 are positioned on a same side with respect to the rotational axis 60.

In the scanner 50, the axis of the camera 68 is in a first plane comprising the axis of the laser 64 and orthogonal to the illumination plane while the axis of the camera 76 is in a second plane comprising the axis of the laser 72 and orthogonal to the illumination plane. When looking at the scanner 50 according to arrow D, the angle between the axis of the camera 68 and the axis of the laser 64 is about thirty degrees while the angle between the axis of the camera 76 and the laser 72 is about –thirty degrees such that each camera 68, 76 is located on a different side of the illumination plane.

In one embodiment, the scanner 50 is about twenty-eight inches high while the circular basis 52 has a diameter of about twenty-two inches. The working distance between the camera lens/laser and the center of the measurement field is from about six inches to about seven inches.

Figure 6:
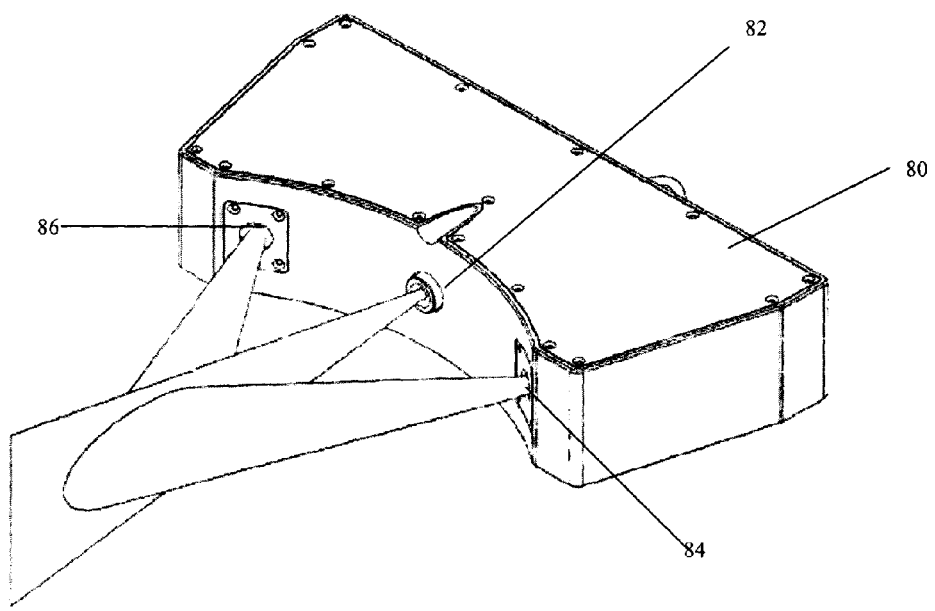
FIG. 6 is a perspective view of a scanning module comprising two cameras, in accordance with an embodiment.

While the scanning modules 54 and 56 each comprise a single camera 68, 76, it should be understood that a scanning module may comprise two or more cameras, as illustrated in FIG. 6. The scanning module 80 comprises a single laser 82 and two cameras 84 and 86. In one embodiment, the scanning modules 54, 56 are each replaced by a scanning module 80 in the scanner 50. Using scanning module 80 allows a further reduction of the shadow effects.

In one embodiment, the scanning modules 54 and 56, and the rotational stage 58 are fixedly secured to the frame 52 while the lasers 64, 72 and the cameras 68, 76 are fixedly secured into their respective scanning modules 54, 56 such that the axis of the lasers 64 and 72, the axis of the cameras 68 and 76, and the rotational axis 60 have a fixed relative position. Having the axis of the cameras and the lasers in a fixed position relative to the rotational axis 60 which is fixed relative to the frame 52 ensures that the elements of the scanner 50 will not be out of alignment because of vibrations, for example. As a result, the number of recalibrations of the scanner 50 needed after its fabrication is greatly reduced. Any mechanical means and/or fabrication techniques for fixedly securing the different elements together can be used. For example, welding, precision machining such as electro-discharge machining, and adhesives can be used for fixedly securing the elements together and ensuring that no axis will move with respect to the other axes.

Figure 7:
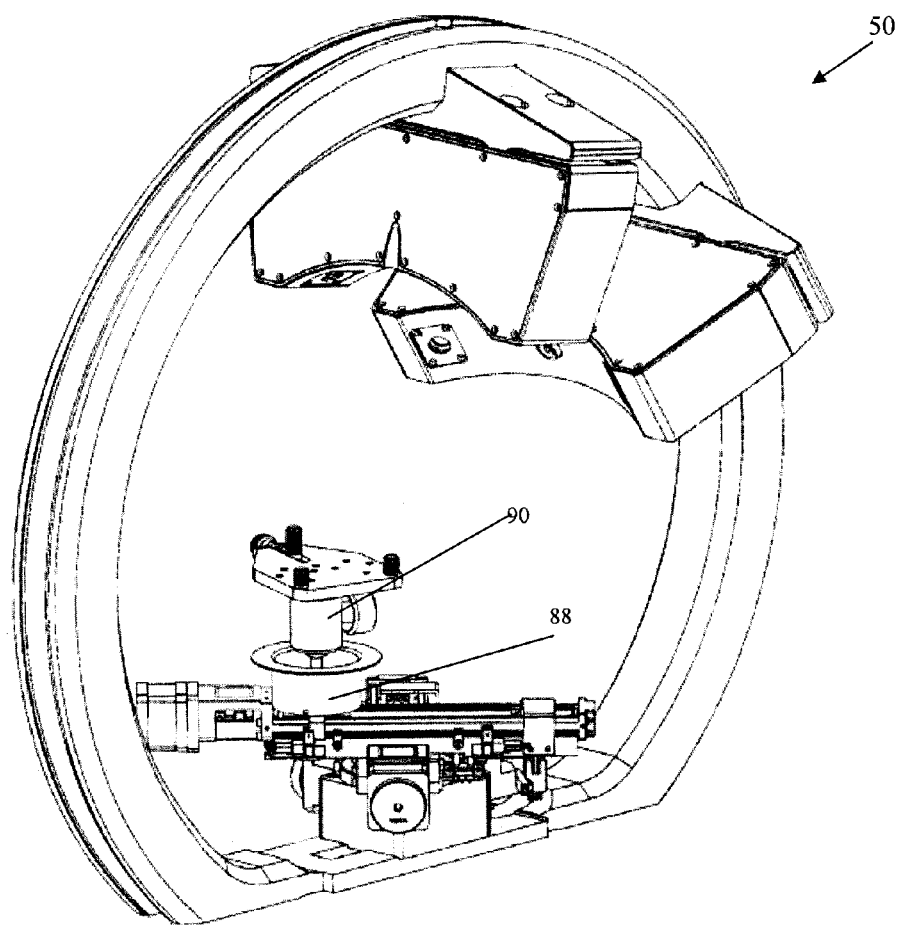
FIG. 7 is a perspective view of a scanner comprising a ball joint plate for tilting an object to be scanned, in accordance with an embodiment.

FIG. 7 illustrates the scanner 50 in which the support assembly is further provided with a ball joint plate 88 and a dental casting holder 90 to receive the object to be scanned. The association of the ball joint plate 88 and the dental casting holder 90 allows tilting of the dental casting in any direction.

The frame can have any shape allowing the appropriate positioning and orientation of the lasers and cameras. The frame can be made from any solid material such as aluminum, for example. In one embodiment, the frame can be a box-like frame that can be closed during scanning for avoiding any interference between the light emitted by the lasers and the ambient light surrounding the scanner. Alternatively, the scanner can be an "open" scanner such as scanner 50. In this case, the lasers and cameras are adapted to minimize the influence of the surrounding light on the measurements. For example, high power lasers and high sensitivity cameras can be used.

In one embodiment, the scanner comprises vibration reducing elements. For example, high quality cross-roller bearings may be inserted in the rotational stage in order to reduce vibrations during rotation of the object.

Any laser emitting light detectable by the cameras can be used. For example, the lasers can emit visible light such as light at 660 nm, infrared light, and the like. The beam of light emitted by the lasers can have any profile, such as a Gaussian profile. Additional optics may be used for obtaining a structured light beam.

While the present description refers to cameras for detecting the light reflected by the lasers, it should be understood that any optical sensor adapted to detect the reflected light can be used. A charge-coupled discharge (CCD) camera, a complementary metal-oxide-semiconductor (CMOS) active-pixel sensor, and the like are examples of optical sensors that can be used in the scanner. In one embodiment, the camera is a CMOS based 1 megapixel monochrome 10 bit digital camera.

In one embodiment, the scanner further includes an electronic module for controlling the motorized translation and rotation stages, the lasers and the cameras.

In one embodiment, a computer is used to operate the scanner and generate the 3D image of the scanned object. In this case, the CPU of the computer is connected to the electronic module. The commands entered in the computer are sent to the electronic module which executes the tasks related to the commands. While the object is rotated, the cameras take images of the object illuminated by the lasers. The CPU receives the images of the object taken by the cameras. From these images, the CPU creates a 3D image of the object using laser triangulation. It should be understood that any laser triangulation methods known by a person can be used to generate the 3D image of the object from the received images taken by the cameras.

In one embodiment, the object is rotated twice from zero degrees to 360 degrees. During the first rotation, images of the object illuminated by a first laser are taken by a first camera. The images are sent to the CPU and stored in a memory. During the second rotation, the object is illuminated by a second laser and images are taken by a second camera. This second set of images is then sent to the CPU and stored in the memory. Alternatively, profiles of the object are extracted "on the fly" from the received images and these profiles are stored in memory.

The embodiments described above are intended to be exemplary only. The scope of the invention is therefore intended to be limited solely by the scope of the appended claims.

We claim:

1. A scanner system for scanning an object comprising:
a frame comprising a support for receiving said object, said support having a rotational axis extending vertically therefrom;
a first laser and a second laser attached to said frame and emitting a first beam of light centered on a first illumination axis and a second beam of light centered on a second illumination axis, respectively, said first laser being positioned and oriented such that said first beam of light illuminates at least a first region of said object when received on said support, said second laser being positioned and oriented such that said second beam of light illuminates at least a second region of said object when received on said support, said first illumination axis and said second illumination axis defining an illumination plane and intersecting said rotational axis at a first intersection angle and a second intersection angle, respectively, said first intersection angle being comprised in a first range from about −15 degrees to about −5 degrees or from about 5 degrees to about 15 degrees, and said second intersection angle being comprised in a second range from about −65 degrees to about −55 degrees or from about 55 degrees to about 65 degrees; and
a first optical sensor and a second optical sensor attached to said frame and having a first field of view centered on a first sensing axis and a second field of view centered on a second sensing axis, respectively, said first optical sensor being positioned and oriented on one side of said illumination plane such that at least said first region of said object is within said first field of view and said second optical sensor being positioned and oriented on another side of said illumination plane such that at least said second region of said object is within said second field of view.

2. The scanner as claimed in claim 1, wherein said first intersection angle is equal to about 10 degrees or −10 degrees and said second intersection angle is equal to about 60 degrees or about −60 degrees.

3. The scanner as claimed in claim 1, wherein said first sensing axis is in a plane that is orthogonal to said illumination plane and that includes said first illumination axis, and said second sensing axis is in a plane that is orthogonal to said illumination plane and that includes said second illumination axis.

4. The scanner as claimed in claim 3, wherein a first sensing angle between said first sensing axis and said first illumination axis is about −30 degrees and a second sensing angle between said second sensing axis and said second illumination axis is about 30 degrees.

5. The scanner as claimed in claim 3, wherein a first sensing angle between said first sensing axis and said first illumination axis is about 30 degrees and a second sensing angle between said second sensing axis and said second illumination axis is about −30 degrees.

6. The scanner as claimed in claim 1, wherein said support comprises a rotational stage for rotating said object.

7. The scanner as claimed in claim 6, wherein said rotating stage is motorized.

8. The scanner as claimed in claim 1, wherein said first laser, said second laser, said first optical sensor, said second optical sensor, and said support are fixedly attached to said frame.

9. The scanner as claimed in claim 1, wherein said first laser and said first optical sensor are enclosed in a first housing secured to said frame, and said second laser and said second optical sensor are enclosed in a second housing secured to said frame.

10. The scanner as claimed in claim 9, further comprising a third optical sensor and a fourth optical sensor enclosed in said first housing and said second housing, respectively, said third optical sensor and said fourth optical sensor having a third sensing axis and a fourth sensing axis, respectively, said third sensing axis being a mirror image of said first sensing axis with respect to said illumination plane and said fourth sensing axis being a mirror image of said second sensing axis with respect to said illumination plane.

11. The scanner as claimed in claim 1, further comprising a first translation stage having a first translation axis and a second translation stage having a second translation axis for moving said support, said first translation axis and said second translation axis being different.

12. The scanner as claimed in claim 11, wherein said first translation stage and said second translation stage are motorized.

13. The scanner as claimed in claim 11, wherein the first translation stage and the second translation stage are positioned above the rotational stage.

14. The scanner as claimed in claim 12, wherein the first translation stage and the second translation stage are positioned above the rotational stage.

* * * * *